United States Patent Office 3,320,696
Patented May 23, 1967

3,320,696
METHOD AND COMPOSITION FOR
SOIL STABILIZATION
Kenneth N. Wright and Raymond R. Reschetz, Decatur,
Ill., assignors to A. E. Staley Manufacturing Company,
Decatur, Ill., a corporation of Delaware
No Drawing. Filed Mar. 10, 1966, Ser. No. 533,253
16 Claims. (Cl. 47—9)

This invention relates to a process of soil stabilization. More particularly, it relates to a method of treatment of soil to minimize the erosion occasioned by the action of wind and rainfall.

Erosion of soil is ordinarily effectively controlled by the natural protective cover of plant life, particularly grasses. The plant cover protects the top layer of soil from the direct impact of rainfall and from the action of wind. The plant root structure, of course, acts as a fibrous, reticulate binder for the top soil.

It is, however, frequently necessary temporarily to remove the top soil and the accompanying plant cover from relatively large areas of land, thus exposing the substrate soil to the erosive action of wind and rain. The action of the latter is particularly serious if the denuded area is sloped, inasmuch as the rain that is not absorbed cannot puddle but must flow downwardly over the surface, carrying soil particles with it. Depending on the character of the soil, the resulting erosion can be referred to either as sheet erosion or as rilling. The former represents a more or less even removal of a soil layer over an area. Rilling, which is a more serious problem, results in the formation of generally parallel channels running from bottom to top of the sloping soil. Rainwater running down these channels in turbulent flow deepens and widens the channels. Eventually, the wall of soil separating adjacent channels becomes thin enough that it collapses and is, in large part, carried away by the flowing water. Rilling, therefore, is generally capable of more rapid soil removal than is sheet erosion.

The obvious method of meeting the problem of erosion is the reestablishment of the protective plant cover, especially grass. However, this is normally a matter of some difficulty, particularly on sloping areas. After the area has been seeded, sufficient moisture must be provided to effect germination and the supply of moisture must be maintained until the grass cover is reasonably established and an adequate root system has been obtained. The application of an excessive amount of water, however, or the occurrence of excessive rainfall will cause the seed to be washed from higher to lower levels on the sloping surface, together with soil from the upper level. Accordingly, an adequate stand of grass, uniformly distributed, will not be obtained.

The above described difficulties may be met, to an extent, by providing a cover for the seeded area. For this purpose, loose-weave or netting fabrics, jute fabrics and open-weave paper fabrics have been employed. These are reasonably effective in controlling erosion and seed loss. However, they afford relatively poor protection during a heavy fall of rain. Furthermore, their placement on and anchoring to the soil involves the expenditure of considerable labor, rendering their use undesirably expensive.

The most commonly employed erosion control material is straw mulch applied in an even layer over the seeded area. Despite its wide use, straw mulch exhibits several serious disadvantages. Wind may remove it from the surface of the soil, particularly on sloping areas. It is a potential fire hazard and it may introduce undesired seeds to the planted area.

The problem of soil erosion is a particularly serious one in highway construction, particularly where the highway passes through hilly areas. Since it is usually desirable to provide as level a roadbed as possible, it is necessary to cut deeply into hilly structures and to thereby denude large, sloping areas of top soil and plant cover. Both practical and aesthetic considerations dictate reestablishment of the plant cover as soon as possible and the control of erosion during the period of such reestablishment.

It is therefore a principal object of the present invention to provide a means of stabilizing soils so as to enhance their resistance to erosion. It is another object to provide a material effective to control erosion in soil for a period of time during which a protective plant cover may be established on the soil. It is yet another object of the invention to provide such a material that may be readily and inexpensively applied to the soil to be treated. The means of attaining these and additional objects of the invention will be evident from the description and examples to follow.

It has been determined that a mixture of corn steep liquor solids and a material that constitutes a source of higher fatty acids, employed in conjunction with a metal compound which is capable of forming insoluble soaps with fatty acids, is an effective agent for stabilizing soil against excessive erosion caused by wind or rainfall. The stabilization obtained by treatment of soil surfaces with these materials is believed to result from the reaction, in situ, in an aqueous medium, between the metal compound and the source of higher fatty acids and between the metal compound and acidic components of the corn steep liquor solids. As will become apparent hereinafter, a number of modes of application of the treating materials is possible, the choice of which will depend on a number of factors evident to the applicator.

Corn steep liquor is the aqueous solution obtained by soaking corn kernels in warm water containing sulfur dioxide as the first step in the wet milling of corn to recover corn starch, corn oil and feed by-products from the corn. Corn steep liquor may conveniently be concentrated to a solids content of about 50% by weight for use in one mode of practicing the present invention. If desired, the solids may be recovered by evaporative concentration for use in other modes of practicing the invention. The recovered solids contain mineral matter as well as soluble organic matter extracted from the corn.

The source of the higher fatty acids may most economically be raw soapstock, also commonly referred to as foots, which is a fluid mixture of soaps, oil and retain impurities that is obtained as a residue when crude, natural fatty oils, such as corn oil or soybean oil, are treated with alkali, such as caustic soda or soda ash. Treatment of raw soapstock with a mineral acid, such as dilute sulfuric acid, decomposes the alkali soaps formed during alkaline treatment, giving rise to what is commonly termed "acidulated soapstock." This is basically a mixture of free fatty acids and contains a minor amount of water. It is obtained as a soft, unctuous mass. When this material is dried it is converted to a harder, wax-like product. Acidulated soapstock is readily dispersible in concentrated corn steep liquor containing 50% of solids, for example, and the dispersion can be dried, by the evaporative removal of water, as by spray drying. If it is desired to employ a significantly less concentrated corn steep liquor in which to disperse the acidulated soapstock, a dispersing agent may advantageously be added to the mixture.

While mineral acids are usually employed to acidulate the soapstocks resulting from the alkaline refining of the above-mentioned oils, it is possible to use corn steep liquor itself as the acidulant. As is known, corn steep liquor may contain, on a dry basis, up to 30 percent of lactic acid. It may exhibit a pH of about 4 or even less.

Accordingly, it will act on the alkaline soapstock to give rise to free fatty acids and water soluble lactates. These soluble lactates are capable, as is lactic acid itself, of reacting with calcium ion or other alkaline earth ion to form insoluble lactates. The formation of such insoluble lactate in the soil treated according to the method of the present invention is believed to be at least partially responsible for the effectiveness of the method. Therefore, the term "acidulated soapstock" is understood to include soapstock acidified solely with corn steep liquor as the acidulant, or with any combination of corn steep liquor and acid.

Even if the corn steep liquor is not sufficiently acidic to effect complete decomposition of the soaps in the soapstock and consequent liberation of all of the free fatty acids, the mixture is still effective in the practice of the method of the present invention. That is, any residual sodium soaps will readily react with calcium ion, for example, to provide the desired water insoluble calcium soaps. Accordingly, alkaline soapstock, incompletely neutralized, comes within the intended definition of a source of higher fatty acids.

The metal compound for use in the practice of the invention must be able to act as a source of a cation capable of reacting with the anion of a higher fatty acid or of a soluble soap to form a water insoluble soap. Calcium hydroxide, ordinary slaked lime, is a particularly preferred material because of its low cost and fertilizer value. Although its solubility in water is low, it is sufficient to permit it to act as a practical source of calcium ion. Calcium acetate is considerably more soluble and may be substituted for the hydroxide if desired, as may magnesium acetate and other water soluble alkaline earth salts. Materials such as calcium carbonate, calcium sulfate and magnesium carbonate are practical substitutes for calcium hydroxide. As sources of these latter materials, commercial grades of limestone, gypsum, dolomite and dolomitic limestones may be employed. Other metal compounds capable of forming insoluble soaps will suggest themselves to those skilled in the art. It is understood, of course, that phytotoxic metal compounds will not be employed in the practice of the invention.

As above indicated, there are a number of methods contemplated by the invention for the application of the stabilizing material to the soil. A convenient method is that of first spraying the area to be treated with aqueous dispersion of a higher fatty acid source, such as acidulated soapstock, in corn steep liquor followed by spray application of a slurry or solution of the desired metal compound on the same area. This method because of its simplicity and the speed with which a given area may be treated, will generally be that most frequently employed. It is possible also, although less desirable, to apply the slurry or solution of the metal compound prior to the spray application of the dispersion.

The above-described spray application method offers additional convenience in that it may readily be employed in conjunction with a hydro-seeding technique. That is, a slurry of grass seed in the aqueous dispersion of soapstock in corn steep liquor may be applied to the soil, after which an application of a lime slurry or the like is made. This simultaneous seeding and conditioning of the soil, minimizing as it does the expenditure of labor required, makes for obvious economy. Further economy may be effected by the addition to the slurry of fertilizer, weed control agents and the like.

While ordinarily the soil stabilizing material is applied to a freshly seeded area, it is within the purview of the invention to apply it to a non-seeded area for the purpose of temporarily minimizing reaction to erosive conditions. Furthermore, application may profitably be made to an area which possesses some grass cover, which cover, however, is either too sparse or too immature to effectively prevent erosion.

Broadly speaking, two methods are available for the dry application of the soil stabilizing materials of the invention. As hereinbefore indicated, the solids contained in the aqueous dispersion of soapstock in corn steep liquor may be recovered by evaporation of the water from the dispersion. This is preferably achieved through spray drying and a dry, pulverulent material is obtained. This material, which may be blended with minor amounts of materials effective to prevent caking and to improve flowability, is spread over the area to be treated. If desired, it may be shallowly worked into the upper surface of the soil. Thereafter, the metal compound is applied to the area. If, as is generally preferred, lime is employed as the metal compound, it may be sprayed in the form of a slurry or it may be spread dry on the soil surface. In the latter case, the treatment is completed by adequate watering of the area.

The lime may, of course, be thoroughly mixed with the dry pulverulent product from the spray drying operation. The resulting mixture is applied to the soil or shallowly worked into the upper surface thereof; the treated area is then thoroughly watered. It will be understood that this mixture of spray dried solids and metal compound should be protected from moisture until used.

In preparing the product for use in the second dry application technique, the dispersion of acidulated or partially acidulated soapstock in corn steep liquor is thoroughly mixed with an inert, particulate solid absorbent material. This mixture is then dried and blended with the requisite amount of lime. The solid absorbent material is preferably one that functions as an organic mulch, such as peat, peat moss, ground corn cobs, soybean hulls, cotton seed hulls, pecan shells, corn gluten feed, spent tanbark or the like. However, non-organic absorbents, such as ground, expanded vermiculite may also be employed. This dry product should also be protected from moisture until used. The method of its use is generally that set out for the previously described dry product.

Of the two dry products described, that in which an absorbent, particulate mulch is employed is generally to be preferred, particularly if application is to involve merely spreading the material on the soil surface. The action of water will be effective to leach from the mulch particles at least a part of the corn steep liquor solids and soapstock material and to carry these materials into the soil, along with lime. The formation of calcium soaps, calcium lactate and calcium phytate, which is believed to be the cause of the soil-binding action, will therefore occur in the soil and on its surface. This same action will occur within the mulch particles and on the surface thereof. As a result, bonding of the mulch particles to each other and to the soil surface appears to take place. Accordingly, the mulch is, to some extent, anchored to the soil surface and is therefore resistant to wind and to the washing effect of rain. In effect, the mulch provides the desired stabilization of the soil to which it is applied and in so doing gains in effectiveness as a mulch or cover. Furthermore, to the extent that it contains unleached corn steep liquor solids, it constitutes a reservoir of plant nutrient material.

The mixture of particulate mulch and soil stabilizing materials may advantageously be further blended with grass seed and plant nutrients, such as sources of nitrogen, phosphorus, potassium and desirable trace elements. The application of the resulting blended material to a soil surface makes it possible, in one operation, to seed and fertilize the soil, to provide it with a protective mulch and to protect the soil surface against the erosive effects of heavy rainfall. It will readily be appreciated that, in the establishment of lawns, golf course greens and the like, the use of this blended material makes for substantial savings in time and labor costs.

If desired, the above-described seed-containing product may also contain either pre-emergent or post emergent weed-killing materials, or both, which are non-toxic to grass and grass seedlings. The grass seed employed may, of course, have been previously treated with fungicidal materials, in the manner known to the art, to prevent damping-off of the grass seedlings. Alternatively, the fungicidal materials may be separately incorporated into the blended material.

A secondary benefit to be obtained from the use of the herein described soil stabilizing materials is the fact that the corn steep liquor is an excellent source of plant nutrients, particularly nitrogen, phosphorus and potassium. The application of 1000 pounds of corn steep liquor solids per acre will provide, for example, 70 pounds of nitrogen, phosphorus equivalent to 65 pounds of $P_2O_5$ and potassium equivalent to 90 pounds of $K_2O$. Accordingly, depending on the quality of the soil in question, the application of fertilizer may be dispensed with or the quantity employed may be markedly reduced. It is, however, generally desirable to provide a quick release source of nitrogen such as urea, ammonium nitrate or the like.

It may occasionally be observed that germination of grass seed in soil treated according to the method of the present invention is somewhat slower than in similar but untreated soil. This is a purely temporary phenomenon, however, and in a reasonable length of time it will be found that essentially the same degree of growth has been attained in each case. Furthermore, if desired, this effect may be minimized by thoroughly soaking the seed in water before seeding, particularly when the above-mentioned hydro-seeding technique is used in conjunction with spray application.

The rate of application of the soil stabilizing materials of the present invention will depend on a variety of factors such as the nature of the soil to be stabilized, the mode of application and the like. For example, if the spray application technique is employed, a relatively porous soil may require a higher rate of application than will a less porous soil for the reason that deeper penetration of the liquid into the porous soil will tend to leave a lesser amount of the dispersion solids near the surface where reaction with the subsequently applied metal compound desirably takes place. However, it will further be understood that the slope of the area treated by spray application must also be taken into account. Thus, a gently sloping, porous soil surface may require a lesser application than a more steeply sloping but less porous soil surface. Furthermore, should the dry solids be applied, as by being worked into the soil surface, the depth of the zone in which stabilization is to occur can be more readily controlled and the rates of application of the dry soilds can properly be more nearly the same for various soils. In any event, the rate of application by spraying will generally be within the range of from about 600 pounds to about 1500 pounds per acre of the mixture of corn steep liquor solids and soapstock. In this mixture, the corn steep liquor solids preferably constitute, on a dry substance basis, from about 85 to about 98 percent of the mixture, the balance of from about 15 to about 2 percent being soapstock. The amount of metal compound is that necessary to insolubilize the acidic components of the mixture. That amount will be from about 60 pounds to about 185 pounds per acre of calcium hydroxide, or an equivalent amount of other metal compound employed.

In considering the concentration of the aqueous dispersion for use in spray application, it is understood that a 10 percent dispersion, for example, contains 10 parts by weight of the mixture of corn steep liquor solids and soapstock. Although the term "dispersion" is employed, it will be recognized that at least a portion of the corn steep liquor solids is actually in solution. Dispersions having a value of concentration of from about 5 percent to about 40 percent may be employed, with from about 10 percent to about 20 percent representing the preferred value. The use of unduly dilute dispersions entails the handling of an unnecessarily large volume of fluid. Furthermore, by transporting the dissolved and dispersed solids relatively deeply into the soil, a dilute dispersion may leave the upper soil layer deficient in these materials so that subsequent applications of the metal compound to the surface will not result in satisfactory stabilization. On the other hand, the use of a highly concentrated dispersion renders accurate metering difficult so that desired even application over a given area may not be obtained. Furthermore, a highly concentrated dispersion may not penetrate the soil to an adequate extent.

When the soil stabilizing materials are applied to the soil as a mixture with a particulate mulch such as peat, the rate of application may advantageously by somewhat higher. These materials will contain, on a dry weight basis, at least about 70 percent of the particulate mulch, from about 10 to 20 percent of corn steep liquor solids, from about 0.2 to about 3 percent of higher fatty acids and from about 1 to about 3 percent of calcium hydroxide or its equivalent as the acetate, oxide, magnesium hydroxide and the like. This mixture is generally applied at a rate of from 4000 to 10,000 pounds per acre, dry weight basis. This treated mulch may contain up to about 18 percent of moisture, although it is preferred that this value should not exceed about 12 percent so that in storage it will not be subject to microbial attack or to the possibility of interaction between the metal compound and the acidic constituents contained therein. If, as is preferred, peat is employed as the particulate mulch, the moisture content of the mixture preferably should not be lower than about 8 percent. If the mixture is dried to a moisture content somewhat below this value, the ability of the peat to absorb and retain moisture is lost and thus the value of the mixture as a mulch is impaired. In general, therefore, the treated mulch should contain from about 10 to about 12 percent by weight of moisture. It should be noted, however, that a mixture dried to a moisture content of less than about 8 percent, while being less effective as a mulch than one of the preferred moisture content, is still capable of imparting erosion resistance to a soil surface to which it is applied.

While peat may constitute as little as 70 percent, of the treated, soil-stabilizing mulch, it is generally desirable that it constitute a somewhat larger percentage of the product. Thus, a preferred product will contain, on a dry weight basis, from about 80 to about 85 percent of peat. This preferred product exhibits greater moisture absorbency and retentivity than does one containing only about 70 percent of peat. Accordingly, it is generally superior to the latter as a mulch. Furthermore, in a product containing grass seed, the enhanced moisture absorbency and retentivity provides an excellent environment for the germination of the seed and for the initial growth of the grass seedlings.

It is, of course, possible to omit the metal compound from the mulch and to apply it separately after the mulch application. Nevertheless, it is obviously most convenient that the mulch contain the metal compound as described above. Soil treatment then involves merely even distribution of the dry product on the soil surface, followed by adequate watering of the treated area. It is, however, generally preferable that the material be shallowly worked into the upper surface of the soil before moisture is supplied.

The invention is further illustrated by the following non-limiting examples.

*Example I*

Florist flats having an area of 0.216 square yard wer filled with a wet sand of the following particle size distributions:

| | Percent |
|---|---|
| Passing 30 mesh screen | 100.0 |
| Passing 40 mesh screen | 99.5 |
| Passing 50 mesh screen | 83.4 |
| Passing 80 mesh screen | 49.4 |
| Passing 100 mesh screen | 19.4 |
| Passing 200 mesh screen | 0.1 |

The sand was leveled to the top of each flat. A standardized solution of corn steep liquor was uniformly sprinkled over the surface of the sand in two flats in an amount necessary to supply 25.7 grams of corn steep solids. These samples are designated A in Table I below. To the sand surface in two other flats, designated B in Table I, corn steep liquor containing acidulated soapstock was uniformly applied to supply 25.7 grams of solids, of which total approximately 1.9 grams represented soapstock. A saturated aqueous solution of calcium hydroxide was then evenly applied to the sand surface in each flat in an amount equivalent to 3.09 grams of calcium hydroxide. The sand in two additional flats was wet with the approximate amount of water provided by the total of the calcium hydroxide solution and the corn steep liquor in the preparation of flats A and B above. These blank or control flats are designated C in Table I.

All flats were stored indoors in a horizontal position for four days. They were then placed out of doors against a wall at an angle of 45° from the ground. Water was applied from a garden hose at a rate of 6.7 quarts a minute to the sand surfaces, the flow being generally directed to a circular area having a diameter of about 10 inches. The time required for the sand to become saturated and flow from the flats was measured. The results are set out in Table I below.

TABLE I

| Sample | Treatment | Flow Time |
|---|---|---|
| C | None—control | 1 minute. |
| C | None—control | 1 minute. |
| A | Corn steep liquor | 1 min. 30 sec. |
| A | Solids and lime | 1 min. 30 sec. |
| B | Corn steep liquor solids | 2 min. 40 sec. |
| B | Acidulated soapstock and lime | 2 min. 20 sec. |

It was furthermore observed that in the initial placing of the flats in the test position, the untreated sand in flats C slumped noticeably even before application of water. The treated sands were stable to the handling involved.

The amounts of materials applied to sample flats A and B above correspond to about 1267 pounds of corn steep liquor solids and 153 pounds of hydrated lime per acre for A and 1193 pounds of corn steep liquor solids, 94 pounds of acidulated soapstock and 153 pounds of hydrated lime for B.

*Example II*

A blend of corn steep liquor solids, acidulated soapstock, mulch and lime was prepared as follows: Corn steep liquor was evaporated to a solids content of about 63 percent by weight. Acidulated soapstock was added and thoroughly mixed into the concentrated corn steep liquor. This mixture was then blended in a ribbon blender with peat which had previously been dried to a moisture content of about 10 percent. Finally, urea and calcium hydroxide were thoroughly blended into the material. The product contained, on a dry solids basis, the following materials in the amounts shown:

| | Percent |
|---|---|
| Corn steep liquor solids | 12.06 |
| Acidulated soapstock | 1.39 |
| Peat moss | 79.24 |
| Urea | 1.59 |
| Calcium hydroxide | 1.74 |
| Inert impurities | 3.98 |

The pulverulent product had a moisture content of 12 percent by weight, an amount insufficient to permit reaction of the calcium hydroxide with the acidic components of the corn steep liquor and soapstock.

A rectangular area of ground having a slope of 12 percent was scraped clear of grass and other plant cover. It was then thoroughly disked to break up the sub-soil and raked to provide a smooth seed bed. A commercial fertilizer was evenly applied thereto at a rate of about 20 pounds per 1000 square feet. Grass seed was then evenly sown at the rate of 5 pounds per 1000 square feet. The area was then divided into three equal, square plots, each having an area of 2500 square feet. One plot was reserved as a control. A even application of peat mulch, at the rate of 150 pounds per 1000 square feet, was made on a second plot, after which the plot was thoroughly hand raked in order to work the peat mulch lightly into the upper surface of the soil. On the surface of the third plot there was evenly distributed the above-described modified peat mulch at the rate of 150 pounds per 1000 square feet. This was not raked into the soil surface. All plots were then gently and thoroughly watered and were watered daily thereafter except on days when rainfall occurred. Over a period of two months the following observations were made. (a) At the end of a 14-day period the degree of germination of the seed in the third plot treated with the modified peat mulch of the present invention was somewhat less than that in the other two plots. However, at the end of 21 days substantially complete germination had occurred in this third plot. At the end of a 42-day period the grass cover of this third plot was definitely superior to that of either of the other plots in regard to color, extent of growth and even distribution over the plot. (b) Rainfall caused substantial rilling of the first two plots but had no effect in this regard on the plot treated with the modified peat mulch. (c) Rainfall washed away substantial amounts of the peat mulch of the second plot, despite the fact that it had been worked into the soil surface. The modified peat mulch of the third plot remained in place. (d) At the end of the observation period the third plot showed no erosion and was uniformly covered with an excellent stand of grass. Both the control plot and the plot treated with ordinary peat mulch showed serious rilling and non-uniform distribution of grass cover. Each displayed areas on which substantially no growth existed.

*Example III*

In a manner similar to that described in the preceding example a seed bed was prepared on an area having a 20 percent slope. After it was seeded, the modified peat mulch of the present invention was applied to the upper half of the plot at the rate of 150 pounds per 1000 square feet. The whole plot was then watered and was watered daily thereafter except on days when rainfall occurred. At the end of 60 days the treated portion of the plot was uniformly covered with a excellent grass cover and showed no evidence of erosion. The lower, untreated portion exhibited severe rilling, the rills generally starting at the line of demarcation between the treated and untreated sections. The grass cover of this portion was negligible, indicating that most of the seed has been carried away by the rainfall.

*Example IV*

In the manner described in Example II three plots were prepared on a 10 percent sloping area. The plots were 30 feet wide and extended 100 feet down the slope. The first plot was provided with a straw mulch at the rate of 2 tons per acre. The second plot was evenly dressed with ordinary peat mulch at the rate of 150 pounds per 1000 square feet. The third plot was dressed with the modified peat mulch of Example II at the same rate of application. Both the ordinary peat mulch and the modified peat mulch were shallowly worked into the soil. Each plot was well watered and was watered twice weekly thereafter during a period of 6 weeks. It was noted that germination was most prompt in the straw mulched plot and most delayed in the plot treated with the modified peat mulch. However, at the end of a 6-week period, this latter plot was well and uniformly covered with healthy grass. The growth in the plot mulched with ordinary peat was spotty, rain having washed out both mulch and seed and concentrating them in discrete areas. Furthermore, the plot showed rilling. The straw mulched plot was not eroded but the grass cover contained weed growth resulting from volunteer seeds contained in the straw. Additionally, the cover was somewhat uneven since minimal growth occurred in areas where the action of wind had either exposed the soil or had shifted the mulch so that the covering was deep enough in some areas to smother growth.

*Example V*

This example is intended to illustrate the effectiveness of the method of the present invention in minimizing erosion and in reestablishing plant cover on sloping, denuded areas.

The site of the investigation, which was initiated in the spring season, was a newly-excavated highway backslope in north central Ohio. The backslope area was on a 2:1 slope and consisted of slightly acidic glacial till material. The area was limed at the rate of four tons per acre. It was then divided into 16 equivalent plots, all of which, save one, received 1000 pounds per acre of 10–10–10 fertilizer. The area was thoroughly disked, seeded with 25 pounds of Kentucky 31 tall fescue and 2 pounds of White Dutch clover per acre and lightly raked. To the thus prepared plots the following surface treatments were applied, using a randomized block design with four replications.

(1) Control (no treatment)
(2) 5% CSL-S+lime
(3) 10% CSL-S+lime
(4) 10% CSL-S+lime (no fertilizer)

In the above, CSL-S indicates corn steep liquor solids, mixed with acidulated soapstock in the approximate weight ratio of 92 to 8 respectively. The concentrations given refer to weight of the thus-defined CSL-S in aqueous dispersion.

These CSL-S dispersions were applied at the rate of 0.3 gallon per square yard. The lime was applied as a 2.5 percent slurry of CaO in water at the rate of 0.125 gallon per square yard, equivalent to approximately 126 pounds of CaO per acre. The application of the CSL-S dispersion of 5 percent concentration is equivalent to the application of about 555 pounds of corn steep liquor solids and about 48 pounds of acidulated soap stock per acre. The use of the 10 percent dispersion, of course, doubles these latter values.

Observation of all the plots were made over an extended period during which normal rainfall occurred. The factors under observation were emergence and stand of seedlings, rilling, erosion and final percent plant cover. One month after treatment, it was found, application of CSL-S markedly reduced both the depth and number of rills per plot and that the 10 percent CSL-S treatment was more effective in this regard than the 5 percent treatment. Furthermore, the rills on the control plot ran the full length of the plot; those on the treated plots were largely confined to the lower third of the sloping plots. In addition to rill erosion, the control plot suffered considerable sheet erosion. This was not the case with the treated plots.

At the end of the growing season, total plant count was made and plant cover evaluated. Total plant count was approximately the same for all treated plots. The plant cover, however, on the unfertilized plot was not equivalent to that on the other treated plots. Plant cover on the untreated control plot was much heavier on the bottom half of the slope than on the top half, indicating early erosion of seeds and fertilizer downslope before seedling establishment. Plant cover on plots treated with the 5 percent dispersion was somewhat greater on the bottom half of the plots, although the variation from top to bottom was substantially less than in the case of the control plot. Plant cover distribution was essentially uniform over the plots treated with the 10% CSL-S dispersion.

*Example VI*

A treated mulch was prepared according to the method of Example II. The mulch was then thoroughly blended with grass seed. The product, which had a moisture content of 12 percent, had the following composition on a dry substance basis:

|  | Percent |
|---|---|
| Peat | 79.92 |
| Corn steep liquor solids | 12.27 |
| Acidulated soapstock | 2.17 |
| Calcium hydroxide | 1.44 |
| Urea | 1.00 |
| Commercial fertilizer | 2.00 |
| Grass seed | 1.20 |

This material was evenly applied to a cultivated, grass-free soil surface at the rate of 200 pounds per 1000 square feet. The material was lightly worked into the surface by raking after which the area was watered until puddling was noted. Watering was repeated daily for a period of four weeks except on days when adequate rainfall occurred. Seedling emergence was evident on the fourth day. At the end of three weeks the area was uniformly and thickly covered with weed-free grass. There was no evidence of erosion or translocation of seed even in sloting sections of the treated area.

Since many embodiments of this invention may be made and since many changes may be made in the embodiments described, the foregoing is to be interpreted as illustrative only and our invention is defined by the claims appended hereto.

What is claimed is:

1. A method of treating soil to increase its resistance to erosion comprising supplying to said soil non-phytotoxic metal compound and a mixture comprising corn steep liquor solids and a minor proportion of a source of higher fatty acids, said metal compound being one that reacts in the presence of water with said mixture to form a water-insoluble reaction product including insoluble salts of said fatty acids, sufficient of said metal compound and mixture being supplied to yield, by reaction on the soil, a soil-stabilizing amount of said reaction product whereby said mixture is set to increase erosion resistance, sufficient moisture being present to permit reaction to take place.

2. A method according to claim 1 wherein the source of higher fatty acids is raw soapstock.

3. A method according to claim 1 wherein the source of higher fatty acids is acidulated soapstock.

4. A method of treating soil to increase its resistance to erosion comprising supplying to the soil non-phytotoxic metal compound and an aqueous dispersion containing from about 5 to about 40 percent by weight of a mixture of corn steep liquor solids and soapstocks, the said mixture containing, on a dry weight basis, from about 85 to about 98 percent by weight of corn steep liquor solids and correspondingly from about 15 to about 2 percent of soapstock, said metal compound being one that reacts in the presence of water with said mixture to form a water-insoluble reaction product including insoluble salts of fatty acids, sufficient of said metal compound and said mixture being supplied to yield, by reaction on the soil, a soil-stabilizing amount of said reaction product whereby said mixture is set to increase erosion resistance, sufficient moisture to permit reaction to take place being present.

5. The method according to claim 4 wherein the metal compound is a member of the group consisting of the oxides, hydroxides, carbonates and water soluble salts of calcium; the oxides, hydroxides, carbonates and water-soluble salts of magnesium; and calcium sulfate.

6. The method according to claim 5 wherein the aqueous dispersion is supplied in an amount sufficient to provide, per acre of soil surface, from about 600 to about 1500 pounds of the mixture of corn steep liquor solids nd soapstock, and the metal compound is applied in an amount equivalent, in salt-forming ability, to from about 10 to about 185 pounds of calcium hydroxide.

7. A composition to be applied to soil to increase its resistance to erosion by means of a water-insoluble reaction product formed on the soil between said composition and a non-phytotoxic metal compound, said composition comprising from about 85 to about 98 parts of corn steep liquor solids and correspondingly from about 15 to about 2 parts of a source of higher fatty acids having the property of forming insoluble soaps with said metal compound in the presence of water.

8. The composition according to claim 7, wherein the source of higher fatty acids is raw soapstock.

9. The composition according to claim 7 wherein the source of higher fatty acids is acidulated soapstock.

10. A method of treating soil to increase its resistance to erosion comprising supplying to said soil a composition comprising a water-absorbent, water retaining particulate mulch containing, on a dry substance basis, from about 10 to about 20 percent of corn steep liquor solids, from about 0.2 to about 3.0 percent of soapstock and a non-phytotoxic metal compound that reacts in the presence of water with one or more salt-forming components of corn steep liquor solids and soapstock to form water-insoluble reaction product, said metal compound being present in an amount at least about stoichiometrically equivalent to the said salt forming components, whereby said composition is set to increase erosion resistance, sufficient moisture being present to permit reaction to take place.

11. The method according to claim 10 wherein the metal compound is a member of the group consisting of the oxides, hydroxides, carbonates, water soluble salts of calcium; the oxides, hydroxides, carbonates and water-soluble salts of magnesium; and calcium sulfate and is present in an amount equivalent, in water-insolubilizing effect to from about 1.0% to about 3 percent of calcium hydroxide.

12. The method of claim 11 wherein the composition is supplied to the soil at a rate of from about 4,000 to about 10,000 pounds per acre of soil surface.

13. The method of claim 10 wherein the composition is shallowly intermixed with the coil.

14. The method of claim 10 wherein the composition is evenly applied to a soil surface.

15. A composition of matter comprising a mixture of a water-absorbent, water-retaining particulate mulch as the major ingredient, corn steep liquor solids, soapstock in relatively minor proportion and a non-phytotoxic metal compound that reacts in an aqueous medium with one or more salt-forming components of the corn steep liquor solids and soapstock to form water-insoluble reaction product, the amount of metal compound in the said composition being sufficient to insolubilize said salt-forming components in the presence of water, the moisture content of said composition being insufficient to permit the salt-forming reaction to take place.

16. A composition of matter comprising a mixture of at least 70 percent by weight of a water-absorbent, water-retaining particulate mulch, from about 10 to about 20 percent of corn steep liquor solids, from about 0.2 to about 3 percent of soapstock and a member of the group consisting of the oxides, hydroxides, carbonates and water soluble salts of calcium; oxides, hydroxides, carbonates and water-soluble salts of magnesium; and calcium sulfate, in an amount equivalent, on a molar basis, to from about 1 to about 3 percent of calcium hydroxide, the said percentages being based on the total amount of composition dry substance, the moisture content of the composition being less than about 18 percent of the total weight of the composition.

References Cited by the Examiner

UNITED STATES PATENTS

| | | | |
|---|---|---|---|
| 1,187,392 | 6/1916 | Sage | 71—25 |
| 1,313,162 | 8/1919 | Brindle et al. | 71—25 |
| 1,348,990 | 8/1920 | Giesecke | 71—25 |
| 2,799,973 | 7/1957 | Smith | 47—58 |
| 2,899,307 | 8/1959 | Wilson | 99—2 |
| 2,901,864 | 9/1959 | Hiler | 47—58 |

ABRAHAM G. STONE, *Primary Examiner.*

R. E. BAGWILL, *Assistant Examiner.*